(12) United States Patent
Namikawa et al.

(10) Patent No.: US 9,030,800 B2
(45) Date of Patent: May 12, 2015

(54) THIN FILM CAPACITOR

(71) Applicant: TDK Corporation, Chuo-ko, Tokyo (JP)

(72) Inventors: Tatsuo Namikawa, Tokyo (JP);
Yoshihiko Yano, Tokyo (JP); Yasunobu Oikawa, Tokyo (JP)

(73) Assignee: TDK Corporation, Tokyo (JP)

(*) Notice: Subject to any disclaimer, the term of this patent is extended or adjusted under 35 U.S.C. 154(b) by 133 days.

(21) Appl. No.: 13/796,822

(22) Filed: Mar. 12, 2013

(65) Prior Publication Data
US 2013/0258544 A1 Oct. 3, 2013

(30) Foreign Application Priority Data
Mar. 29, 2012 (JP) ................................. 2012-077367

(51) Int. Cl.
| | |
|---|---|
| H01G 4/30 | (2006.01) |
| H01G 4/228 | (2006.01) |
| H01G 4/20 | (2006.01) |
| H01G 4/06 | (2006.01) |
| H01G 4/33 | (2006.01) |
| H01G 4/38 | (2006.01) |
| H01G 4/232 | (2006.01) |

(52) U.S. Cl.
CPC .............. *H01G 4/306* (2013.01); *H01G 4/228* (2013.01); *H01G 4/33* (2013.01); *H01G 4/38* (2013.01); *H01G 4/232* (2013.01)

(58) Field of Classification Search
CPC ........... H01G 4/228; H01G 4/30; H01G 4/38; H01G 4/33; H01G 4/306
USPC ..................... 361/306.1, 311, 312, 313, 301.4
See application file for complete search history.

(56) References Cited

U.S. PATENT DOCUMENTS

| | | | |
|---|---|---|---|
| 4,811,162 A | 3/1989 | Maher et al. | |
| 5,043,843 A | 8/1991 | Kimura et al. | |
| 5,312,581 A | 5/1994 | Amano et al. | |
| 5,712,758 A | 1/1998 | Amano et al. | |
| 5,774,326 A | 6/1998 | McConnelee et al. | |
| 6,118,647 A | 9/2000 | Okinaka et al. | |
| 6,254,971 B1 | 7/2001 | Katayose et al. | |
| 6,337,790 B1 | 1/2002 | Nellissen et al. | |
| 2005/0111162 A1* | 5/2005 | Osaka et al. | 361/271 |
| 2007/0064374 A1 | 3/2007 | Togashi et al. | |
| 2007/0074806 A1 | 4/2007 | Kojima et al. | |

* cited by examiner

FOREIGN PATENT DOCUMENTS

JP 2011-077151 A 4/2011

*Primary Examiner* — Nguyen T Ha
*Assistant Examiner* — Arun Ramaswamy
(74) *Attorney, Agent, or Firm* — Posz Law Group, PLC (57) ABSTRACT

A thin film capacitor includes an under electrode, a plurality of dielectric body layers and a plurality of internal electrode layers that are alternately laminated on the under electrode, the internal electrode layers respectively including protrusion parts that each protrude from the dielectric body layers viewed in the lamination direction, and connection electrodes to which at least a portion of each of the protrusion parts contacts. Assuming that protrusion amounts of the protrusion parts of the internal electrode layers that are connected to the same connection electrode are regarded as L, a protrusion amount $L_n$ of a protrusion part of $n^{th}$ ($n \geq 2$) internal electrode layer from the under electrode side is smaller than another protrusion amount $L_{n-1}$ of another protrusion part of $(n-1)^{th}$ internal electrode layer.

18 Claims, 4 Drawing Sheets

THIN FILM CAPACITOR

TECHNICAL FIELD

The present invention relates to a thin film capacitor.

BACKGROUND

Like a thin film capacitor described, for example, in patent related document 1, dielectric body layers and internal electrode layers are alternately laminated and form a multilayer body constituting multiple layers, and configuration where a portion of this multilayer body is exposed and is connected to a terminal electrode is known.

PRIOR RELATED DOCUMENT

Patent Related Document 1: Japanese Laid-Open Patent Application No. 2011-77151

SUMMARY

However, in the thin film capacitor described in Japanese Laid-Open Patent Application No. 2011-77151, end parts of the internal electrode layers are exposed so as to protrude from the dielectric body layers viewed from the lamination direction of a multilayer body and the connection with the connection electrode is secured. Consequently, especially out of variations of the protrusion amount, when the protrusion amount of the internal electrode layer at the lower side (under electrode side) viewed from the lamination direction is smaller than that of the internal electrode layer at the upper side, the connection between the lower internal electrode layer and the connection electrode easily becomes unstable. Therefore, a situation easily occurs where capacitance, which is presumed in the design stage, cannot be sufficiently obtained.

The present invention has been accomplished by taking these drawbacks above into consideration. The object is to provide a thin film capacitor that enables improvement of the stability of the electric connection between the internal electrode layers and the connection electrode.

In order to solve the drawbacks, a thin film capacitor of the present invention includes an under electrode, a plurality of dielectric body layers and a plurality of internal electrode layers that are alternately laminated on the under electrode, the internal electrode layers respectively including protrusion parts that each protrude from the dielectric body layers viewed in the lamination direction, and connection electrodes to which at least a portion of each of the protrusion parts contacts. Assuming that protrusion amounts of the protrusion parts of the internal electrode layers that are connected to the same connection electrode are regarded as L, a protrusion amount $L_n$ of a protrusion part of $n^{th}$ (n≥2) internal electrode layer from the under electrode side is smaller than another protrusion amount $L_{n-1}$ of another protrusion part of $(n-1)^{th}$ internal electrode layer.

Further, it is preferred for the thin film capacitor that the protrusion amounts $L_n$ and $L_{n-1}$ of the protrusion parts of the internal electrode layers satisfy $L_{n-1}-L_n \geq 2$ μm. With this design, the stability of the electric connection between the internal electrode layers and the connection electrode is further improved. Then, when the stability of the electric connection is improved, the product yield becomes better.

Further, it is preferred that the connection electrodes include at least a first connection electrode and a second connection electrode, and assuming that an average of a protrusion amount difference of the protrusion amount $L_n$ and the protrusion amount $L_{n-1}$ of the protrusion parts of the internal electrode layers connected through the first connection electrode is regarded as $t_1$, and another average of the protrusion amount difference of the protrusion amount $L_n$ and the protrusion amount $L_{n-1}$ of the protrusion parts of the internal electrode layers connected through the second connection electrode is regarded as $t_2$, $t_1$ and $t_2$ are different. According to such configuration, it is difficult for cracks due to stress to occur, and the stability of the electric connection with the connection electrode is further improved.

Further, it is preferred for the thin film capacitor that the first connection electrode is connected to the under electrode, the second connection electrode is not connected to the under electrode, the averages $t_1$ and $t_2$ of the protrusion amount differences are in a relationship of $t_1 < t_2$. According to such configuration, because the electric resistance of the internal electrode layers connected by the second connection electrode becomes further closer to the electric resistance with the internal electrode layers connected by the first connection electrode that is connected to the under electrode, the stability of the electric resistance is further improved.

According to the thin film capacitor relating to the present invention, it becomes possible to improve the stability of the electric connection between the internal electrode layers and the connection electrode.

DETAILED DESCRIPTION OF EMBODIMENTS

Hereafter, preferred embodiments of the present invention are described. However, the present invention shall not be limited to the embodiments below. Furthermore, the same or the similar elements are marked with the same symbols, and if the description is redundant, such description will be omitted.

Figure 1A:
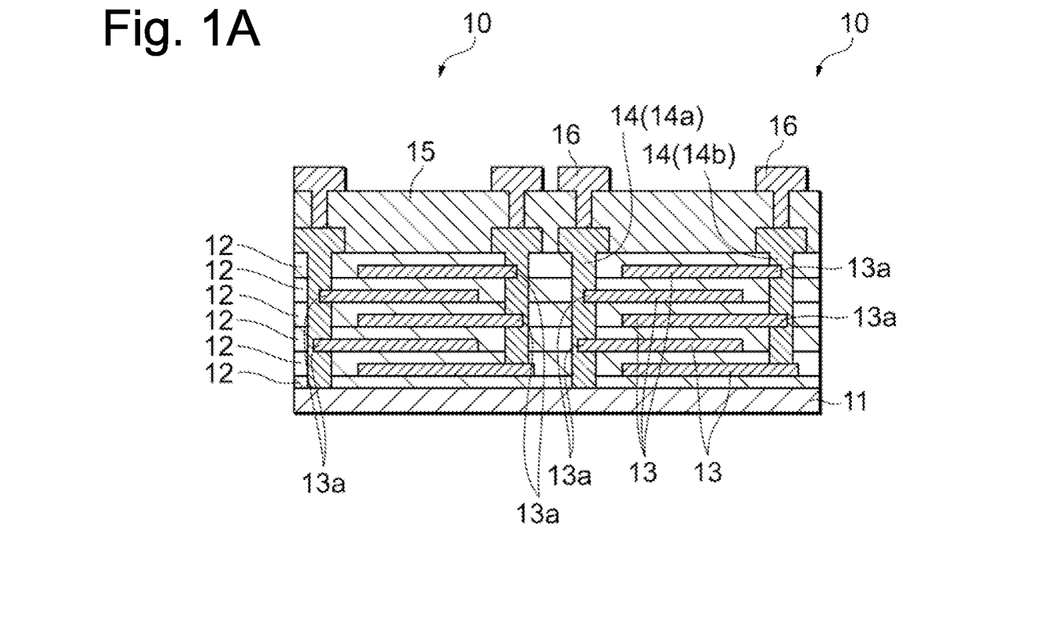
FIGS. 1A and 1B are schematic cross-sectional views showing a structure of a thin film capacitor relating to an embodiment of the present invention.
Figure 1B:
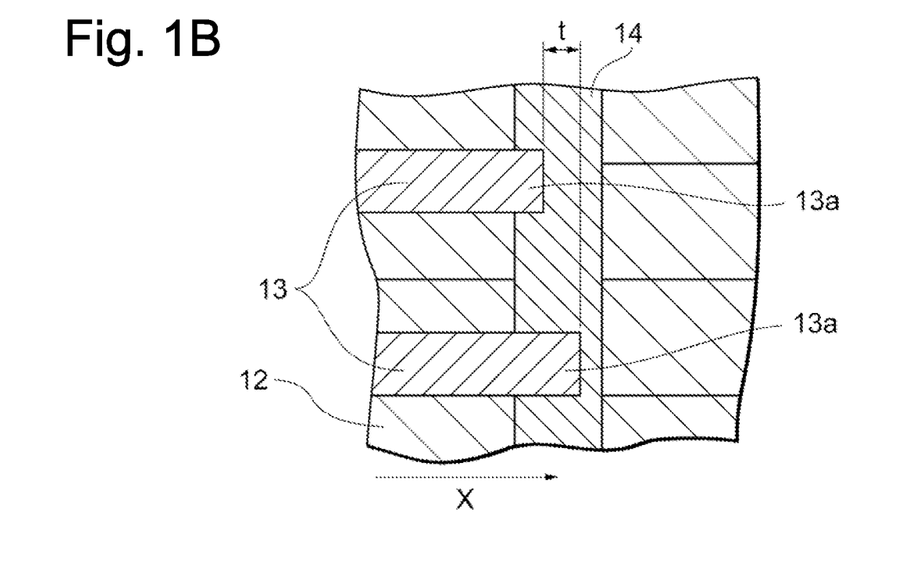

FIGS. 1A and 1B are schematic cross-sectional views showing a structure of the thin film capacitor relating to the present embodiment, respectively. FIG. 1A shows a schematic cross-sectional view showing structures of two thin film capacitors relating to the present embodiment. Thin film capacitor 10 is configured by including an under electrode 11, two or more dielectric body layers 12 laminated onto this under electrode 11, internal electrode layers 13 laminated in between the dielectric body layers 12, connection electrodes 14 that are electrically connected to the internal electrode layers 13, a passivation layer 15 as a surface protective film, and terminal electrodes 16. For comparison, FIG. 1A illustrates aggregate composed of two thing film capacitors 10. This aggregate can be divided into one thin film capacitor 10 by singulation.

The dielectric body layers 12 and the internal electrode layers 13 form a multilayer body by alternate lamination. Furthermore, in FIG. 1A, although the state of the lamination with the dielectric body layers 12 and the internal electrode layers 13 is simplified by including six layers of the dielectric body layers 12 and five layers of the internal electrode layers 13, in the thin film capacitor 10 of the present embodiment, several hundreds of the dielectric body layers 12 and the internal electrode layers 13 can form a multilayer body.

FIG. 1B shows a schematic view where the schematic cross-sectional view of the connection portion between the internal electrode layers 13 and the connection electrode 14 in the thin film capacitors 10 shown in FIG. 1A is enlarged. The internal electrode layers 13 have a protrusion part 13a that protrudes toward the connection electrode 14 (in the X-direction) from the dielectric body layer 12 viewed from the lamination direction, respectively. In addition, at least a portion of the protrusion part 13a is connected to the protrusion part 13a and the connection electrode 14. In other words, the connection electrode 14 is electrically connected to the internal electrode layer 13 through the surface and end surface of the internal electrode layer included in the protrusion part 13a of this internal electrode layer 13, respectively. In order to improve the connection stability of these internal electrode layers 13, it has been found that connection can be assured with the configuration below, in the thin film capacitors of the present embodiment.

In the protrusion part 13a of the internal electrode layer 13, the direction of protrusion from the dielectric body layer 12 toward the connection electrode 14 is one of two directions viewed from the lamination direction, and the other alternately protrudes toward the connection electrode 14 in two directions. In other words, with a connection electrode 14a (14a in FIG. 1A), which is one of the connection electrodes 14, the under electrode 11 and $1^{st}$, $2^{nd}$ ... internal electrode layers 13 from the lower side are connected, and with a connection electrode 14b (14b of FIG. 1A), which is the other one of the connection electrode 14, the $1^{st}$, $2^{nd}$ internal electrode layers 13 from the lower side are connected. The connection electrodes 14 include the protrusion parts 13a. For comparison, the internal electrode layers 13 connected to the connection electrode 14a are connected to the under electrode 11 and the odd-numbered, such as $1^{st}$, $3^{rd}$ ... internal electrode layers 13, from the lower side viewed from the entire internal electrode layers 13 of the thin film capacitor 10. Similarly, the other connection electrode 14b is connected to the even-numbered, such as $2^{nd}$, $4^{th}$ ... internal electrode layers 13, from the under electrode side viewed from the entire internal electrode layers 13 of the thin film capacitor 10.

In addition, in FIG. 1A, in the thin film capacitors 10, a pair of connection electrodes 14 has at least two connection electrodes 14 one of which is the first connection electrode 14a and the other of which is the second connection electrode 14b. The first connection electrode 14a in FIG. 1A makes contact with (is connected to) the under electrode 11. The other second connection electrode 14b in FIG. 1A does not make contact with (is not connected to) the under electrode 11.

Then, particularly in the present embodiment, the protrusion parts 13a of the internal electrode layers 13 are configured so as to satisfy the conditions below. In other words, regarding a protrusion amount L of the protrusion parts 13a toward the dielectric body layers 12 in the internal electrode layers 13 connected to the connection electrode 14 (for example, 14a in FIG. 1A), when a protrusion amount of the protrusion 13a of the $n^{th}$ (n≥2) internal electrode layer 13 counting from the under electrode 11 is regarded as $L_n$ and a protrusion amount of the protrusion 13a of the $(n-1)^{th}$ internal electrode layer 13 is regarded as $L_{n-1}$, these satisfy the following conditional expression (1):

$$L_n < L_{n-1} \quad (1)$$

Furthermore, the protrusion amount L of the protrusion part 13a indicates maximum length of the portion where the protrusion part 13a makes contact with (is connected to) the connection electrode 14.

The protrusion amount $L_n$ of the protrusion part 13a of the $n^{th}$ (n≥2) internal electrode layer 13 counting from the under electrode 11 is preferably smaller by 2 μm or more than the protrusion amount $L_{n-1}$ of the protrusion part 13a of the $(n-1)^{th}$ internal electrode layer 13. In other words, for the internal electrode layers 13 connected to the same connection electrode 14, the difference between the protrusion amount $L_n$ of the $n^{th}$ (n≥2) internal electrode layer 13 counting from the under electrode 11 and the protrusion amount $L_{n-1}$ of the $(n-1)^{th}$ internal electrode layer 13 is preferably 2 μm or more. That is, it is preferable that the protrusion amounts $L_n$ and $L_{n-1}$ satisfy the following expression (2):

$$L_{n-1} - L_n \geq 2 \text{ μm} \quad (2)$$

This enables to sufficiently secure the connection area of the $(n-1)^{th}$ internal electrode layer 13 and the connection electrode 14, and to further stabilize the connection status.

For the internal electrode layers 13 connected to the same connection electrode 14, when the protrusion amount $L_n$ of the $n^{th}$ (n≥2) internal electrode layer 13 counting from the under electrode 11 is greater than the protrusion amount $L_{n-1}$ of the $(n-1)^{th}$ internal electrode layer 13, the $n^{th}$ internal electrode layer 13 is in a hood-like shape (shape to overlay the $(n-1)^{th}$ internal electrode layer 13 when observing toward the under electrode 11). Consequently, it is believed that a connection area that is enough to stabilize the electric connection between the $(n-1)^{th}$ internal electrode layer 13 and the connection electrode 14 is not secured, and that the connection status becomes unstable.

Further, for the internal electrode layers 13 connected to the same connection electrode 14, when the protrusion amount L of the $n^{th}$ (n≥2) internal electrode layer 13 counting from the under electrode 11 is the same as the protrusion amount $L_{n-1}$ of the $(n-1)^{th}$ internal electrode layer 13, the $n^{th}$ internal electrode layer 13 shall becomes shaped to substantially overlap the $(n-1)^{th}$ internal electrode layer 13 when observing toward the under electrode 11. Consequently, the $(n-1)^{th}$ internal electrode 13 is connected to the connection electrode 14 only in the vicinity of the end part, and it is believed that a connection area that is enough to stabilize the electric connection cannot be secured, and the connection status becomes unstable.

For the internal electrode layers 13 connected to the same connection electrode 14, the difference between the protrusion amount $L_n$ of the $n^{th}$ (n≥2) internal electrode layer 13 counting from the under electrode 11 and the protrusion amount $L_{n-1}$ of the $(n-1)^{th}$ internal electrode layer 13 is preferably 2 μm or more, and more certain connectivity can be obtained. However, if the difference in the protrusion amount is too great, it becomes necessary to have wider connection electrodes 14. In other words, in the thin film capacitor 10, a ratio of an area occupied by the connection electrodes 14 becomes greater. Consequently, a portion for obtaining capacitance in the thin film capacitor 10 becomes smaller, and as a result, the capacitance as the thin film capacitors 10 is reduced. Consequently, the difference $L_{n-1}-L_n$ between $L_n$ and $L_{n-1}$ is preferably approximately 2 µm to 50 µm, and is further preferably approximately 2 µm to 10 µm.

With the protrusion amount L of the protrusion parts 13a of the internal electrode layers 13 having connection with the connection electrode 14, the difference between the protrusion amount $L_n$ of the $n^{th}$ (n≥2) internal electrode layer 13 counting from the under electrode 11 and the protrusion amount $L_{n-1}$ of the (n−1)$^{th}$ internal electrode layer 13 can be indicated as t. For example, for the difference t of this protrusion amounts, because there are a plurality of layers of the internal electrode layers 13, there are a plurality of differences t in one connection electrode 14, the average of the differences of the protrusion amounts can be an average t.

Figure 4A:
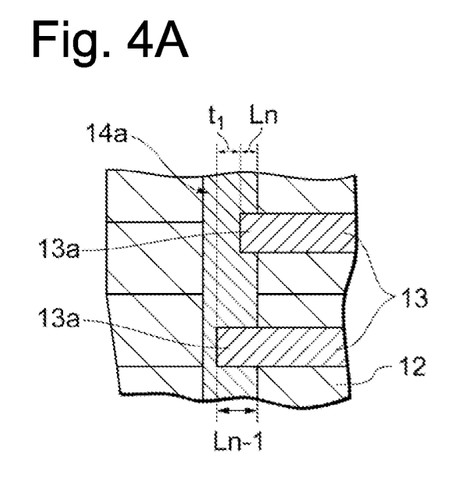
FIGS. 4A and 4B are schematic views where the schematic cross-sectional view of the connection portion between either a first connection electrode or a second connection electrode and the internal electrode layers, out of the connection electrodes of the thin film capacitor in FIG. 1A.
Figure 4B:
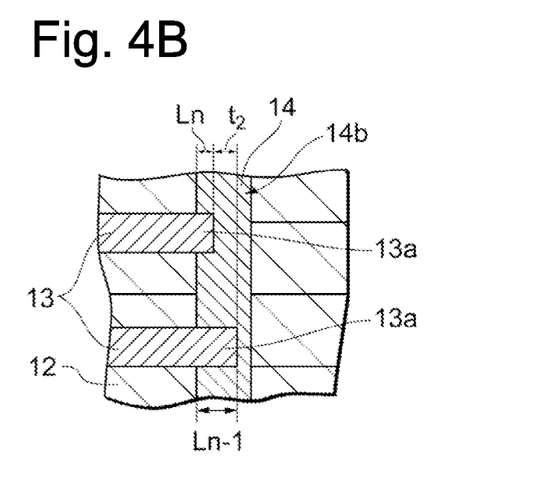

FIGS. 4A and 4B show schematic views where the schematic cross-sectional view of a connection portion between the internal electrode layers 13 and the first connection electrode 14a or the second connection electrode 14b out of the connection electrodes 14 of the thin film capacitors 10 in FIG. 1A is enlarged, respectively. In FIG. 4A, for the internal electrode layers 13 at positions to be connected to the first connection electrode 14a, a difference between the (n−1)$^{th}$ protrusion amount $L_{n-1}$ and the $n^{th}$ protrusion amount $L_n$ is regarded as t1. In this case, in the drawing, a single protrusion amount difference is illustrated as t1, but in the case of having multiple layers, this can be regarded as an average t1 of the protrusion amount differences. In addition, in FIG. 4A, for the internal electrode layers 13 at positions to be connected to the second connection electrode 14b, a difference between the (n−1)$^{th}$ protrusion amount $L_{n-1}$ and the $n^{th}$ protrusion amount $L_n$ is regarded as t2. In this case, in the drawing, a single protrusion amount difference is illustrated as t2, but in the case of having multilayer, this can be regarded as an average t2 of the protrusion amount differences.

At this time, it is preferable that the average t1 of protrusion amount differences and the average t2 of protrusion amount differences are different. If the averages t1 and t2 of the protrusion amount differences are different, it becomes difficult for the stress to the connection between the connection electrodes 14 and the internal electrode layers 13 to be concentrated to the center of the thin film capacitors 10, and there is an effect where it is difficult for cracks or peel-off attributable to the stress to occur. In other words, according to such configuration, it is difficult for cracks and peel-off due to the stress to occur, and the stability of the electric connection with the connection electrodes can be further improved. For this relationship, even if errors due to the manufacturing variation are included, [such configuration] has the effect where it is difficult for the cracks or peel-off to occur.

In addition, in the thin film capacitors 10, compared to the average t1 of the protrusion amount differences of the first connection electrode 14a connected to the under electrode, the average t2 of the protrusion amount differences of the second connection electrode 14b is preferably greater, i.e., the relationship t1<t2 is preferable. According to such configuration, because the electric resistance of the internal electrode layers connected through the second connection electrode and that with the internal electrode layers connected through the first connection electrode connected to the under electrode are further closer, the stability of the electric resistance can be further improved. In addition, the characteristic of equivalent series resistance (ESR) of the thin film capacitors 10 also tends to be improved, and it is further preferable.

The internal electrode layers 13 are preferably configured by containing an inexpensive base metal material as a main component for the purpose of cost reduction, and since the internal electrode layers 13 are sintered along with the dielectric body layers 12, it is preferably configured particularly with Ni as a main component. If Ni is contained as a main component and the protrusion amount satisfies the conditions above, the stability of the connection is particularly effectively improved. It is believed that this is because the crystal grains of the Ni internal electrode layers and the protrusion amount are in the most suitable state. Furthermore, the internal electrode layers 13 can be configured so as to contain at least, for example, one of Ni, Pt, Pd, Ir, Ru, Rh, Re, Os, Au, Ag, Cu, $IrO_2$, $RuO_2$, $SrRuO_3$ and $LaNiO_3$. It is preferable that the thickness of the internal electrode layer 13 is approximately 100 to 800 nm.

The under electrode 11 can be configured by containing, for example, at least one of Ni, Pt, Pd, Ir, Ru, Rh, Re, Os, Au, Ag, Cu, $IrO_2$, $RuO_2$, $SrRuO_3$ and $LaNiO_3$. The film thickness of the under electrode is preferably 50 to 2,000 nm. Further, the under electrode 11 and a substrate can be made of the same material. In such case, to reduce cost, inexpensive base metal, such as Ni, Cu or Al, an alloy thereof as a main component, stainless steel, or Inconel (registered trademark) is preferable, and Ni foil is particularly preferable. The film thickness in the case of using the same material for the under electrode 11 and the substrate is preferably 5 µm to 500 µm. In the present embodiment, the Ni foil is used for the under electrode 11, and this combines a function as a retainer member to retain the dielectric body layer 12 and another function as a substrate to form the dielectric body layer 12. In addition, if the Ni foil is used, in the case of sintering after laminating the internal electrode layers 13 and the dielectric body layers 12, cracks or peel-off hardly occurs to the multilayer body. Therefore, in the thin film capacitor of the present embodiment, in order to control the protrusion amount, it is preferable to minimize cracks or peel-off in the multilayer. Thus, the under electrode 11 relating to the present embodiment preferably has a configuration to double as a substrate, such as a metal foil, and as an electrode. However, a structure with substrate/electrode film including a substrate made of Si or alumina and a substrate made of a metal film may be used as the under electrode 11.

For the dielectric body layer 12, perovskite oxides, such as BT (i.e., barium titanate: $BaTiO_3$), BST (i.e., barium strontium titanate: $(BaSr)TiO_3$), ST (i.e., strontium titanate: $SrTiO_3$), CZ (i.e., calcium zirconate: $CaZrO_3$), perovskite type oxide, such as $BaSr)(TiZr)O_3$, $BaTiZrO_3$, or the like, are preferably used. The dielectric body film 12 can contain one or more of these oxides. It is preferable that the film thickness of the dielectric body layer 12 is approximately 100 to 800 nm.

The connection electrode 14 may be made of an inexpensive base metal material, such as Cu, but one configured by using Ni, Pt, Pd, Ir, Ru, Rh, Re, Os, Au, Ag or Ir at least in a portion is preferable, and one constructed by using Ni as a main component is particularly preferable. Inexpensive base metal, such as Cu, easily damages the internal electrode layers 13 and the dielectric body layer 12 due to passage of oxygen in the connection region, and the connectivity may also become poor. Depending upon the required reliability, such base metal may not be able to be used. Furthermore, the connection electrode 14 can have a multi-layer structure, for example, with Ni/Cu. In this case, a method to ensure contact in the Ni layer and to supplement the conductivity at the Cu side is particularly preferable. In any event, configuration using Ni, Pt, Pd, Ir, Ru, Rh, Re, Os, Au, Ag or Ir at least in a portion as a main component is preferable, and the configuration using Ni at least in a portion as a main component is particularly preferable.

The passivation film 15 may be made of an insulating resin, such as polyimide resin, epoxy resin, phenol resin, benzocyclobutene resin, polyamide resin or fluorine contained resin.

The terminal electrode 16 is preferably configured by containing Cu as a main component. Furthermore, a layer of Au, Sn or Pd may be established in the external layer of the terminal electrode 16.

Next, with reference to FIGS. 2A to 2F and FIGS. 3A to 3C, a method for manufacturing the thin film capacitor 10 is explained. As an example, FIGS. 2A to 2F illustrate aggregate composed of two thin film capacitors 10. These can be divided into one thin film capacitor 10 by singulation.

Figure 2A:
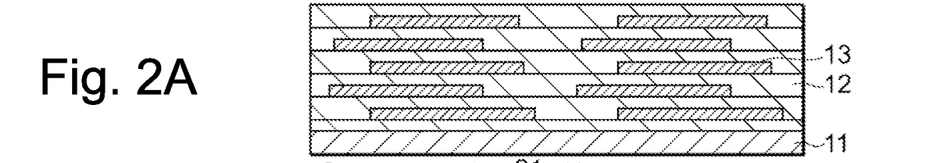
FIGS. 2A to 2F are schematic cross-sectional views showing a method for manufacturing the thin film capacitor relating to the embodiment of the present invention.

At first, as shown in FIG. 2A, film formation of the dielectric body layers 12 and film formation of the internal electrode layers 13 using a mask are alternately repeated on the under electrode 11, and a multilayer body is formed. At this time, for the internal electrode layers 13, the films are formed using a mask so as to alternately displace the film formation position at predetermined amplitude per layer. Further, in the region connected to the terminal electrode, mask shape is specified so as to recess the end portions in the upper layer internal electrode layers 13.

Figure 2B:
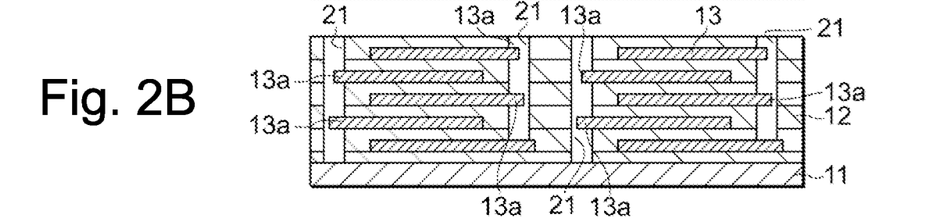

Next, as shown in FIG. 2B, wet etching is applied from the surface position at the opposite side of the under electrode 11 in the multilayer body so as to expose the protrusion parts 13a of the internal electrode layers 13, and openings 21 are formed. At this time, etching liquid (etchant) that etches a dielectric body but that does not etch an electrode layer is used. Specifically, for example, when the dielectric body film is BT, BST or ST, a preferred etchant is a hydrochloric acid+ammonium fluoride solution. Further, when the dielectric body film is CZ, the preferred etchant is a sulfuric acid+ammonium fluoride solution. Herein, the protrusion amount L of the protrusion part 13a exposed to the opening 21 by wet etching means maximum length of the protrusion part 13a in the opening 21.

Figure 3A:
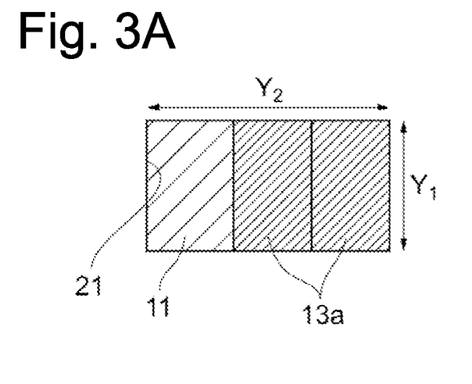
FIGS. 3A to 3C are schematic diagrams showings typical configurations regarding an opening and an end part of the internal electrode layer in the thin film capacitor relating to the embodiment of the present invention.
Figure 3B:
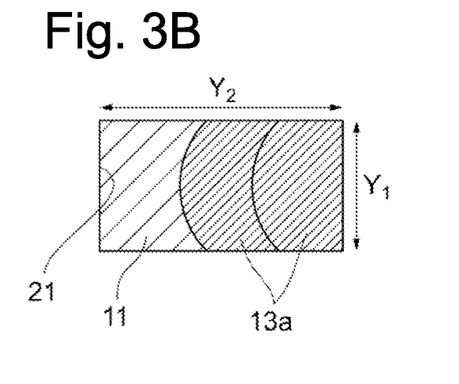
Figure 3C:
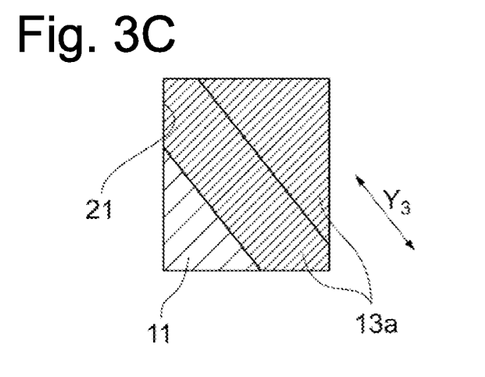

FIGS. 3A to 3C show typical schematic shapes of the protrusion parts 13a of the internal electrode layers 13 when an opening 21 is observed toward the under electrode 11, after the roughly-rectangular opening 21 shown in FIG. 2B is formed. For example, as shown in FIG. 3A and FIG. 3B, in the opening 21 at the time of observing toward the under electrode 11, if the end part of the protrusion parts 13a are aligned in the longer side direction (aligned so as to parallelize a shorter side direction Y1 and the end parts of the protrusion parts 13a) out of the shorter direction Y1 and the longer side direction Y2 of the roughly-rectangular opening 21, when the number of laminations is increased, it becomes possible to sufficiently establish (expose) the protrusion part 13a in each internal electrode layer 13 within the opening 21. In addition, as shown in FIG. 3C, if the end parts of the protrusion parts 13a are parallel with a diagonal direction Y3 of the roughly-rectangular opening 21 upon observing toward the under electrode 11, even when the number of laminations is increased, because more area can be secured with regard to each protrusion part 13a within the opening 21, it becomes possible to more certainly expose the internal electrode layers 13.

Figure 2C:
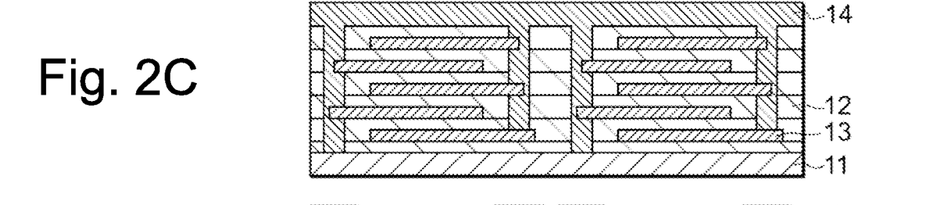
Figure 2D:
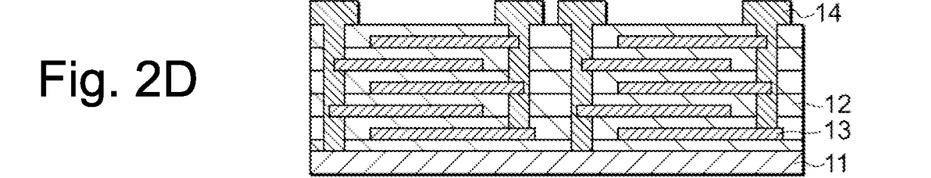

Next, as shown in FIG. 2C, a connection layer is formed in the openings 21. For example, a film is formed throughout the entire surfaces and end surfaces of the protrusion parts 13a of the internal electrode layers 13 along the inner walls of the openings so as not to cause any voids, by sputtering.

Figure 2E:
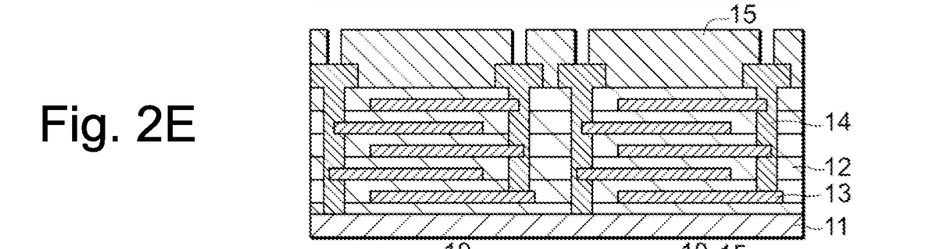
Figure 2F:
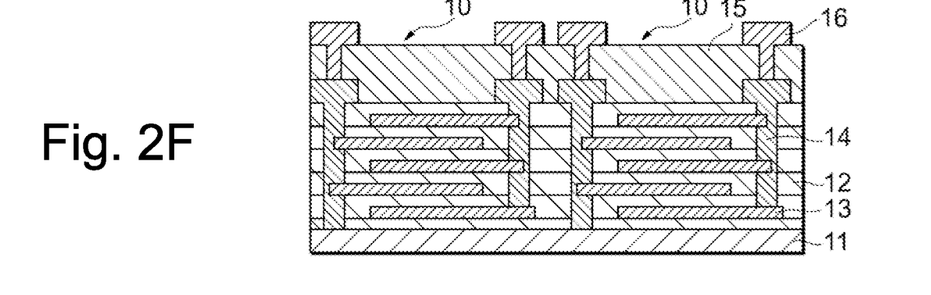

Then, the connection electrodes 14 are molded by patterning (FIG. 2D) and the passivation film 15 is formed if necessary (FIG. 2E). Then, the terminal electrodes 16 are further formed so as to connect to the connection electrodes 14 by seed film formation and plating treatment (FIG. 2F).

Thus, according to the thin film capacitor 10 relating to the present embodiment, because the internal electrode layers 13 and the connection electrodes 14 are connected through at least a part of the surface and end surfaces of the internal electrode layers 13 contained in the protrusion parts 13a of the internal electrode layers 13, a contact area of both is increased, and the connection status is stabilized. In addition, in the internal electrode layers 13 connected through the same connection electrode, if the protrusion amount $L_n$ of the protrusion 13a of the $n^{th}$ (n≥2) internal electrode layer 13 counting from the under electrode 11 is designed to be smaller than the protrusion amount $L_{n-1}$ of the protrusion 13a of the $(n-1)^{th}$ internal electrode layer 13, the protrusion amount L of the protrusion parts 13a appropriately ranges so as to be suitably connected to the connection electrodes 14, and the connection status between the internal electrode layers 13 and the connection electrodes 14 can be further stabilized. As a result, it becomes possible to improve the electric connection between the internal electrode layers 13 and the connection electrodes 14. Then, when the connection status is stabilized, product yield is improved and the reliability is also improved.

In addition, from the viewpoint to stabilize the connection status by increasing the contact area between the internal electrode layers 13 and the connection electrodes 14, a portion of the protrusion part 13a of each internal electrode layer 13 in the opening 21 preferably has a relationship where the protrusion amount $L_n$ of the protrusion 13a of the $n^{th}$ (n≥2) internal electrode layer 13 counting from the under electrode 11 is smaller than the protrusion amount $L_{n-1}$ of the protrusion 13a of the $(n-1)^{th}$ internal electrode layer 13.

In other words, the protrusion parts of the internal electrode layers connected to the same connection electrode out of the connection electrodes are viewed from the lamination direction toward the under electrode, at least a portion of the protrusion part of the $(n-1)^{th}$ (n≥2) internal electrode layer counting from the under electrode side is preferably exposed from the protrusion parts of the $n^{th}$ internal electrode layer.

Figure 5A:
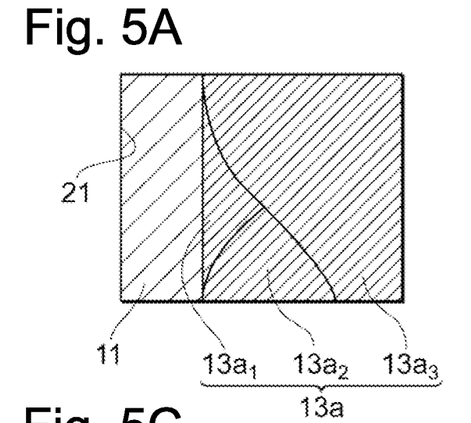
FIGS. 5A to 5C are schematic diagrams showing configurations regarding the opening and the end part of the internal electrode layers in the thin film capacitor relating to the embodiment of the present invention.
Figure 5B:
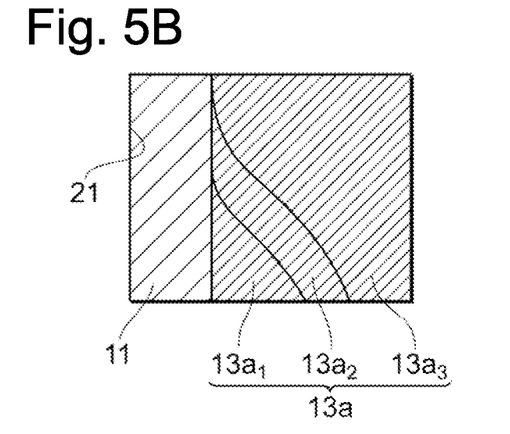
Figure 5C:
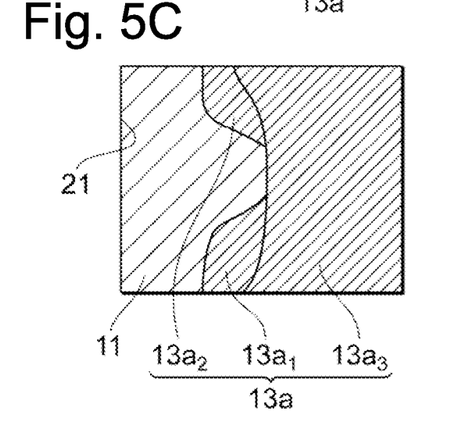

FIGS. 5A to 5C show schematic views where at least a portion of the protrusion part of the $(n-1)^{th}$ (n≥2) internal electrode layer counting from the under electrode side is exposed from the protrusion parts of the $n^{th}$ internal electrode layer when viewed from the lamination direction toward the under electrode. In FIGS. 5A to 5C, the shape of the protrusion part 13a of the internal electrode layers 13 in another embodiment in the case of observing the opening 21 toward the under electrode 11 after the opening 21 is formed when the internal electrode layers contain six layers is illustrated. FIGS. 5A to 5C illustrate the protrusion part 13a of the internal electrode layer 13 the closest to the under electrode 11 side from the under electrode 11 toward the lamination direction as a protrusion part $13a_1$, the protrusion part 13a of the $2^{nd}$ internal electrode layer 13, which is next, as $13a_2$, and the protrusion part 13a of the $3^{rd}$ internal electrode layer 13, which is next, as $13a_3$. In the protrusion parts $13a_1$, $13a_2$ and $13a_3$, as shown in FIGS. 5A to 5C, at least a portion of all the protrusion parts $13a_1$, $13a_2$ and $13a_3$ of the internal electrodes 13 to be connected to the connection electrode 14 of the opening 21 is visible within the opening 21 upon observing toward the under electrode 11. When the number of laminations is increased, it becomes possible to sufficiently establish (expose) the protrusion part 13a in each internal electrode layer 13 within the opening 21 without expanding the opening 21.

For comparison, in FIG. 5A and FIG. 5B, although the maximum protrusion amount L of the protrusion parts $13a_1$, $13a_2$ and $13a_3$ is the same, compared to the maximum protrusion amount $L_1$ of the protrusion part $13a_1$ of the internal electrode 13 the closest to the under electrode 11 side, the maximum protrusion amount $L_2$ of the protrusion part $13a_2$ of the $2^{nd}$ internal electrode 13, which is next, has a smaller region. Then, compared to the maximum protrusion amount $L_2$ of the protrusion part $13a_2$ of the $2^{nd}$ internal electrode 13, the maximum protrusion amount $L_3$ of the protrusion part $13a_3$ of the $3^{rd}$ internal electrode 13, which is next, has a smaller region, and, is in a relationship to have a smaller region than the maximum protrusion amount $L_1$ of the protrusion part $13a_1$ and the maximum protrusion amount $L_2$ of the protrusion part $13a_2$. With this relationship, the protrusion part $13a$ is sufficiently established and exposed in each internal electrode layer 13 within the opening 21.

In FIGS. 5A, 5B and 5C, the first connection electrode 14a is illustrated, but the effect can be obtained similarly with this construction even in the second connection electrode 14b. In addition, regarding this relationship, even when errors are included due to manufacturing variation, the similar effect can be obtained.

Film formation of the dielectric body layers 12 and mask film formation of the internal electrode layers 13 are alternately repeated on the under electrode 11, and a multilayer body is formed. At this time, adjustment can be conducted by changing the shape of the region connected to the connection electrode 14, which is a mask of the internal electrode layer, i.e., changing the protrusion part 13a, and by conducting mask film formation.

EXAMPLES

Hereafter, the present invention is further specifically explained with reference to examples. However, the present invention shall not be limited to the embodiments below.

The thin film capacitors shown in FIG. 1 were manufactured and evaluated as Examples 1 to 6 and Comparative Examples 1 to 3.

Examples 1 to 6

In the thin film capacitors 10, six layers of the dielectric body layers 12 were laminated on the Ni foil under electrode 11 using BT, and the internal electrode layers 13 were laminated using Ni as the first internal electrode layer 13 to the fifth internal electrode layer 13 by alternately sputtering with the dielectric body layers 12. With this step, the number of layers of the under electrode 11 as the Ni substrate and the dielectric body layer 12 sandwiched by the internal electrode layers 13 becomes five. A pattern shape on the occasion of film formation of the internal electrode layers 13 and thickness of the dielectric body layers 12 were set so as to have approximately 6,000 pF (6 nF) of one layer of the dielectric body layer 12.

In addition, as shown in FIG. 1B, for four layers from the second internal electrode layer 13 to the fifth internal electrode layer 13, in order to satisfy a positional relationship where the internal electrode layers 13 connected by the same connection electrode 14 as smaller protrusion amount in respective order from the under electrode 11 side, their shape was specified using a mask pattern. In other words, the internal electrode layers 13 at the positions to be connected with the connection electrode 14 were arranged so as to position the end part of the fourth internal electrode layer 13 to be closer to the inner side of the end part of the second internal electrode layer 13, and, so as to position the end part of the fifth internal electrode layer 13 to be closer to the inner side of the end part of the third internal electrode layer 13, respectively. In other words, the internal electrode layers 13 connected by the same connection electrode 14 were arranged so as to have smaller protrusion amount L of the $2^{nd}$ internal electrode layer 13 than the protrusion amount L of the $1^{st}$ internal electrode layer 13 in respective order from the under electrode 11 side.

For the internal electrode layers 13 at positions to be connected with the connection electrode 14, a difference between the end part of the $4^{th}$ internal electrode layer 13 and the end part of the $2^{nd}$ internal electrode layer 13 (for the internal electrode layers 13 connected through the one same connection electrode 14, the protrusion amount L of the $2^{nd}$ internal electrode layer 13 is the $1^{st}$ internal electrode layer) is regarded as $t_1$, and, a difference between the end part of the $5^{th}$ internal electrode layer 13 and the end part of the $3^{rd}$ internal electrode layer 13 (for the internal electrode layers 13 connected through another same connection electrode 14, the protrusion amount L of the $2^{nd}$ internal electrode layer 13 is the $1^{st}$ internal electrode layer) is regarded as $t_2$, and mask shape was specified so as to have relationships: $t_1=t_2=15$ μm (Example 1), 10 μm (Example 2), 5 μm (Example 3), 3 μm (Example 4), 2 μm (Example 5) and 1 μm (Example 6) on the mask pattern, and these thin film capacitors 10 to be Examples 1 to 6 were prepared. In other words, $t_1$ and $t_2$ correspond to a difference $t(=L_{n-1}-L_n)$ of protrusion amounts of the internal electrode layers 13 shown in FIG. 1B.

In other words, the difference $t_1$ between the end part of the $4^{th}$ internal electrode layer 13 and the end part of the $2^{nd}$ internal electrode layer 13 is a difference of the protrusion amount in the first connection electrode connected to the under electrode 11. Then, the difference $t_2$ between the end part of the $5^{th}$ internal electrode layer 13 and the end part of the $3^{rd}$ internal electrode layer 13 is a difference of the protrusion amount in the second connection electrode not connected to the under electrode 11.

In Examples 1 to 6, after the dielectric body layers 12 and the internal electrode layers 13 were laminated, a resist layer having the openings 21 was formed on a thermally-treated aggregate at a position enabling the connection with the internal electrodes. The shape of the opening 21 was designed to be a rectangle on the mask pattern, and the size was set at 30 μm×40 μm on the mask pattern. Then, the dielectric body layers 12 at the openings 21 were etched using a mixed solution of hydrochloric acid+ammonium fluoride. Due to this etching, the dielectric body layers 12 at the openings 21 were removed, and, the protrusion parts 13a were formed by realizing the state where end parts of the internal electrode layers 13 protruding from the side walls of the dielectric body layers 12 at the openings 21. Then, after the resist layer was peeled off, a thermal treatment was applied again. Then, a conductor layer for connection (connection electrode 14) was formed in the opening 21. The passivation layer 15 was further formed using polyimide resin, and the terminal electrode 16 was further formed using Cu.

Using such technique, 30 thin film capacitors 10 were manufactured for each of the above described $t_1$ and $t_2$ values, and capacitance was measured in these thin film capacitors 10, and the average values and standard deviations were calculated. In addition, the conductor layer for connection (connection electrode 14) and the internal electrode layers 13 were cut by focused ion beam (FIB), and 30 each of the $t_1$ and $t_2$ values were measured and their averages were regarded as actually-measure $t_1$ and $t_2$ values, respectively.

Comparative Example 1

Other than the arrangement of the internal electrode layers 13 where the $t_1$ value was set at 2 μm and the $t_2$ value was set at 0, i.e. at positions to be connected with the connection electrode 14 on the mask pattern so as to position the end parts of the $5^{th}$ internal electrode layer 13 and the $3^{rd}$ internal electrode layer 13 to be the same, the thin film capacitors 10 were manufactured as similar to Example 1. The capacitance of the thin film capacitor 10 was measured as similar to Example 1, and its mean value and standard deviation were calculated. In addition, similarly, the conductor layer for connection (connection electrode 14) and the internal electrode layers 13 were cut by FIB, and 30 each of $t_1$ and $t_2$ values were measured and their averages were regarded as actually-measure $t_1$ and $t_2$ values, respectively.

Comparative Example 2

Other than the arrangement of the internal electrode layers 13 where both the $t_1$ and $t_2$ values were set at 0, i.e. at positions to be connected with the connection electrode 14 on the mask pattern so as to position the end parts of the $4^{th}$ internal electrode layer 13 and the $2^{th}$ internal electrode layer 13 to be the same and to position the end parts of the $5^{th}$ internal electrode layer 13 and the $3^{rd}$ internal electrode layer 13 to be the same, the thin film capacitors 10 were manufactured as similar to Example 1. The capacitance of the thin film capacitor 10 was measured as similar to Example 1, and its mean value and standard deviation were calculated. In addition, the conductor layer for connection (connection electrode 14) and the internal electrode layers 13 were cut by FIB, and 30 each of $t_1$ and $t_2$ values were measured and their averages were regarded as actually-measure $t_1$ and $t_2$ values, respectively.

Comparative Example 3

Other than the arrangement of the internal electrode layers 13 where both the $t_1$ and $t_2$ values were set at −2 μm, i.e. at positions to be connected with the connection electrode 14 on the mask pattern so as to position the end parts of the $4^{th}$ internal electrode layer 13 to be outside the $2^{nd}$ internal electrode layer 13, and, to position the end parts of the $5^{th}$ internal electrode layer 13 to be outside and the $3^{rd}$ internal electrode layer 13, the thin film capacitors 10 were manufactured as similar to Example 1. The capacitance of the thin film capacitor 10 was measured as similar to Example 1, and its mean value and standard deviation were calculated. In addition, the conductor layer for connection (connection electrode 14) and the internal electrode layers 13 were cut by FIB, and 30 each of $t_1$ and $t_2$ values were measured and their averages were regarded as actually-measure $t_1$ and $t_2$ values, respectively.

For Example 1 to 6 and Comparative Example 1 to 3 described above, the mean values and the standard deviation for each of the $t_1$ and $t_2$ values are shown in Table 1.

TABLE 1

| | $t_1$ and $t_2$ Values on Mask Pattern (μm) | | Actually-measured $t_1$ and $t_2$ Values (μm) | | Mean Capacitance (nF) | Standard Deviation of Capacitance (nF) |
|---|---|---|---|---|---|---|
| | $t_1$ | $t_2$ | $t_1$ | $t_2$ | | |
| Example 1 | 15 | 15 | 14.5 | 14.8 | 32.18 | 3.27 |
| Example 2 | 10 | 10 | 9.9 | 10.1 | 32.28 | 2.64 |
| Example 3 | 5 | 5 | 5.3 | 5.1 | 31.87 | 2.92 |
| Example 4 | 3 | 3 | 2.9 | 3.0 | 32.21 | 3.46 |
| Example 5 | 2 | 2 | 2.1 | 2.3 | 32.10 | 3.24 |
| Example 6 | 1 | 1 | 1.2 | 0.9 | 32.07 | 6.97 |
| Comparative Example 1 | 2 | 0 | 2.1 | −0.1 | 30.58 | 14.77 |
| Comparative Example 2 | 0 | 0 | −0.2 | −0.1 | 27.22 | 18.26 |
| Comparative Example 3 | −2 | −2 | −1.8 | −2.1 | 24.67 | 19.89 |

As shown in Table 1, in Examples 1 to 5 where the mask shapes were specified to be $t_1=t_2=15, 10, 5, 3, 2$ μm, respectively, and where 2.1 to 14.8 μm of protrusion amounts were obtained, it was confirmed to have substantially the same capacitance as the set value (6 nF per layer; 30 nF as thin film capacitor 10). The standard deviation of the capacitance was substantially 3 nF, and variation was small. Further, in Example 6 where the mask shape was specified to be $t_1=t_2=1$ μm, and where 0.9 μm and 1.2 μm of protrusion amounts were obtained, it was confirmed to have substantially the same capacitance as the set value, but the standard deviation of the capacitance indicated a slightly greater value approximately at 7 nF. In the meantime, in Comparative Example 1 where the mask shape was specified to be $t_{1=1}$ μm and $t_2=0$, and where 2.1 μm and −0.1 μm of protrusion amounts, i.e., one was indented, it was confirmed that the capacitance greatly varied. Further, in Comparative Examples 2 and 3 where the mask shape was specified to be $t_1=t_2=0$ and −2 μm, respectively and where −0.2 μm and −0.1 μm, and, −1.8 μm and −2.1 μm of protrusion amounts, i.e., both were indented, it was confirmed that the mean capacitance was lower than the designed value, and, variation was great.

In other words, the thin film capacitors 10 in Examples 1 to 5 had sufficient capacitance compared to those in the comparative examples, and could reduce less variation in the capacitance, and it was confirmed that stable electric connection between the internal electrode layers 13 and the connection electrodes 14 would become possible.

Further, since the thin film capacitor 10 in Example 6 had slightly greater variation in the capacitance compared to the thin film capacitors in Examples 1 to 5, if the difference of the protrusion amounts in the internal electrode layer 13 was set to 2 μm or greater, it was confirmed that the electric connection between the internal electrode layers 13 and the connection electrodes 14 would be further stable.

In addition, in the thin film capacitors 10 in Examples 1 to 6, the difference in the protrusion amount $t_1$ between the protrusion amounts $L_n$ and $L_{n-1}$ of the protrusion parts of the internal electrode layers connected through the first connection electrode was different from the difference in the protrusion amount $t_2$ between the protrusion amounts $L_n$ and $L_{n-1}$ of the protrusion parts of the internal electrode layers connected through the second connection electrode, and any cracks attributable to the stress were not confirmed.

Examples 7 and 8

Except the arrangement of the internal electrode layers 13 so as to position the end part of the $6^{th}$ internal electrode layer 13 to be inner side the end of the 4$^{th}$ internal electrode layer and to position the end part of the 7$^{th}$ internal electrode layer 13 to be inner side the end of the 5$^{th}$ internal electrode layer, in addition to four layers from the 2$^{nd}$ internal electrode layer 13 to the 5$^{th}$ internal electrode layer 13, the thin film capacitors were manufactured as similar to Example 1.

For the internal electrode layers 13 positioned to be connected with the connection electrodes 14, the difference between the end part of the 4$^{th}$ internal electrode layer 13 and the end part of the 2$^{nd}$ internal electrode layer 13 and the difference between the end part of the 6$^{th}$ internal electrode layer 13 and the end part of the 4$^{th}$ internal electrode layer 13 are set at the same $t_1$, and the difference between the end part of the 5$^{th}$ internal electrode layer 13 and the end part of the 3$^{rd}$ internal electrode layer 13 and the difference between the end part of the 7$^{th}$ internal electrode layer 13 and the end part of the 5$^{th}$ internal electrode layer 13 were set at the same $t_2$, and the mask shape was specified so as to have $t_1=t_2=15$ μm (Example 7) and $t_1=10$ and $t_2=9$ μm (Example 8), and the thin film capacitors to be Examples 7 and 8 were manufactured.

Comparative Example 4

Other than the arrangement of the internal electrode layers 13 where $t_1$ and $t_2$ values were set at 0 μm in Example 7, i.e., positions to be connected to the connection electrode 14 on the mask pattern so as to position the end parts of the 7$^{th}$, 5$^{th}$ and 3$^{rd}$ internal electrode layers 13 to be the same, and, to position the end parts of the 6$^{th}$, 4$^{th}$ and 2$^{nd}$ internal electrode layers 13 to be the same, the thin film capacitors were manufactured as similar to Example 7.

In Examples 7 and 8 and Comparative Example 4, the capacitance of the thin film capacitors was measured as similar to Example 1, and its mean value and standard deviation were calculated. In addition, similarly, the conductor layer for connection (connection electrode 14) and the internal electrode layers 13 were cut by FIB, and the $t_1$ and $t_2$ values for the 30 thin film capacitors were measured and their averages were regarded as actually-measured $t_1$ and $t_2$ values, respectively. For the differences of the protrusion amounts $t_1$ and $t_2$ values, since there were a plurality of layers of the internal electrode layers 13, a plurality of differences of the protrusion amounts $t_1$ and $t_2$ values were averaged per the first or second connection electrode, they were deemed as the average $t_1$ and $t_2$ values. For the actually measured values, the average values were deemed as the average $t_1$ and $t_2$ values. A mean value and a standard deviation of the capacitance on this occasion were similarly measured. Results are shown in Table 2.

TABLE 2

| | $t_1$ and $t_2$ Values on Mask Pattern (μm) | | Actually-measured $t_1$ and $t_2$ Values (μm) | | Mean Capacitance (nF) | Standard Deviation of Capacitance (nF) |
|---|---|---|---|---|---|---|
| | $t_1$ | $t_2$ | $t_1$ | $t_2$ | | |
| Example 7 | 15 | 15 | 14.5 | 14.8 | 40.23 | 4.09 |
| Example 8 | 10 | 9 | 9.9 | 9.1 | 40.35 | 3.30 |
| Comparative Example 4 | 0 | 0 | −0.1 | 0 | 34.03 | 22.83 |

The thin film capacitors in Examples 7 and 8 had sufficient capacitance, and could reduce less variation in the capacitance, and it was confirmed that a stable electric connection between the internal electrode layers 13 and the connection electrodes 14 would become possible.

In addition, in Examples 7 and 8, the difference in the protrusion amount $t_1$ between the protrusion amounts $L_n$ and $L_{n-1}$ of the protrusion parts of the internal electrode layers connected through the first connection electrode was different from the difference in the protrusion amount $t_2$ between the protrusion amounts $L_n$ and $L_{n-1}$ of the protrusion parts of the internal electrode layers connected through the second connection electrode. No cracks attributable to the stress were confirmed in all obtained thin film capacitors.

A characteristic of ESR was measured in the thin film capacitors of Examples 7 and 8, a lower value was obtained in Example 8 than that in Example 7.

Example 9

For six layers from the 2$^{nd}$ internal electrode layer 13 to the 7$^{th}$ internal electrode layer 13, other than the exposure of the protrusion parts 13$a_1$ to 13$a_3$ of the internal electrode layers 13 connected to through the same connection electrode 14 without intentionally shifting the positions of the end parts of the protrusion parts 13$a$ of the internal electrode layers 13 using the mask pattern with the shape as shown in FIG. 5A, the thin film capacitors to be Example 9 were manufactured as similar to Example 8. In the manufacturing step, after two openings 21 to be the connection electrodes 14 were formed, the two openings 21 were observed toward the under electrode 11, respectively, and it was confirmed that at least a portion of all the protrusion parts 13$a_1$, 13$a_2$ and 13$a_3$ of the internal electrode layer 13 to be connected to the connection electrode 14 of the openings 21 was visible, respectively.

In addition, the capacitance of the thin film capacitors was measured as similar to Example 1, and its mean value and standard deviation were calculated. As a result, the mean capacitance (nF) was 40.09 nF and the standard deviation of the capacitance was 8.01 nF, and it was confirmed that the electric connection between the internal electrode layers 13 and the connection electrodes 14 became stable.

What is claimed is:

1. A thin film capacitor, comprising:
an under electrode;
a plurality of dielectric body layers and a plurality of internal electrode layers that are alternately laminated on the under electrode, the internal electrode layers respectively including protrusion parts that each protrude from the dielectric body layers viewed in the lamination direction; and
connection electrodes positioned perpendicularly to the plurality of internal electrode layers and/or the under electrode layer, to which at least a portion of each of the protrusion parts contacts the connection electrodes, wherein
assuming that insert amounts of the protrusion parts of the internal electrode layers that are connected to the same connection electrode are regarded as L, an insert amount Ln of a protrusion part of nth (n≥2) internal electrode layer from the under electrode side is smaller than another insert amount Ln−1 of another protrusion part of (n−1)th internal electrode layer.

2. The thin film capacitor according to claim 1, wherein the insert amounts Ln and Ln−1 of the protrusion parts of the internal electrode layers satisfy $Ln-1-Ln>2$ μm.

3. The thin film capacitor according to claim 1, wherein the connection electrodes include at least a first connection electrode and a second connection electrode, and assuming that an average of an insert amount difference of the protrusion amount Ln and the insert amount Ln−1 of the protrusion parts of the internal electrode layers connected through the first connection electrode is regarded as t1, and another average of the insert amount difference of the insert amount Ln and the insert amount Ln−1 of the protrusion parts of the internal electrode layers connected through the second connection electrode is regarded as t2, t1 and t2 are different.

4. The thin film capacitor according to claim 2, wherein the connection electrodes include at least a first connection electrode and a second connection electrode, and assuming that an average of an insert amount difference of the insert amount Ln and the insert amount Ln−1 of the protrusion parts of the internal electrode layers connected through the first connection electrode is regarded as t1, and that another average of the insert amount difference of the insert amount Ln and the insert amount Ln−1 of the protrusion parts of the internal electrode layers connected through the second connection electrode is regarded as t2, t1 and t2 are different.

5. The thin film capacitor according to claim 3, wherein the first connection electrode is electrically connected to the under electrode; and the averages t1 and t2 of the insert amount differences are in a relationship of t1<t2.

6. The thin film capacitor according to claim 4, wherein the first connection electrode is electrically connected to the under electrode; and the averages t1 and t2 of the insert amount differences are in a relationship of t1<t2.

7. A thin film capacitor, comprising:

an under electrode;

a plurality of dielectric body layers and a plurality of internal electrode layers that are alternately laminated on the under electrode, the internal electrode layers respectively including protrusion parts that protrude from the dielectric body layers viewed in the lamination direction; and connection electrodes positioned perpendicularly to the plurality of internal electrode layers and/or the under electrode layer to which at least a portion of each of the protrusion parts contacts the connection electrodes, wherein among the protrusion parts of the internal electrode layers that are connected to the same connection electrode, when viewed from the lamination direction toward the under electrode, at least a portion of the protrusion part of (n−1)th internal electrode layer (n≥2) is exposed from the protrusion part of nth internal electrode layer.

8. The thin film capacitor in claim 1, wherein an edge of each of the protrusion parts are curved.

9. The thin film capacitor in claim 7, wherein an edge of each of the protrusion parts are curved.

10. The thin film capacitor in claim 1, wherein the under electrode is longer than each of the plurality of internal electrodes in the horizontal direction.

11. The thin film capacitor in claim 7, wherein the under electrode is longer than each of the plurality of internal electrodes in the horizontal direction.

12. A thin film capacitor, comprising:

an under electrode;

a plurality of dielectric body layers and a plurality of internal electrode layers alternately laminated onto the under electrode, the internal electrode layers each include protrusion parts that protrude from the dielectric body layers into the connection electrodes; and connection electrodes positioned perpendicularly to the plurality of internal electrode layers and/or the under electrode layer, to which at least a portion of each of the protrusion parts contacts the connection electrodes, wherein each of the protrusion parts has a different surface area.

13. The thin film capacitor in claim 12, wherein the protrusion parts are arranged in descending order based on increasing surface area with a protrusion part having a greatest surface area being closest to the under electrode.

14. The thin film capacitor in claim 12, wherein each protrusion part has a length that corresponds to a distance of the protrusion part from the under electrode, so that the protrusion part located farthest from the under electrode has a shortest length, and a protrusion part located closest to the under electrode has a longest length.

15. The thin film capacitor in claim 12, wherein the surface area of each of the protrusion parts decreases as each protrusion part is positioned further away from the under electrode.

16. The thin film capacitor in claim 12, wherein a difference between respective lengths of adjacent protrusion parts exposed to the connection electrodes is at least 2 μm.

17. The thin film capacitor in claim 12, wherein the under electrode is longer in the horizontal direction than each of the plurality of internal electrodes.

18. The thin film capacitor in claim 12, wherein an edge of each of the protrusion parts are curved.

\* \* \* \* \*